Sept. 24, 1957     H. ERDMANN     2,807,078
APPARATUS FOR ASSEMBLING OPEN-ENDED SPRING RETAINING
RINGS ON GROOVED SHAFTS, PINS AND THE LIKE
Filed July 7, 1955     2 Sheets-Sheet 1
FIG. 1
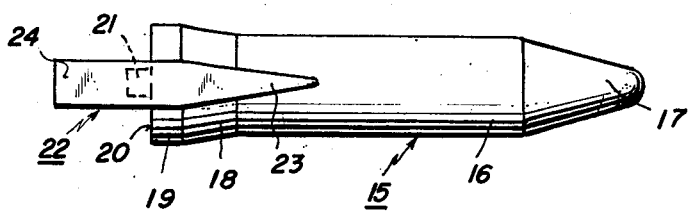
FIG. 2     FIG. 3
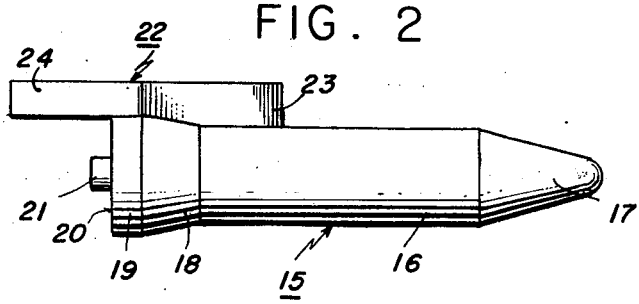 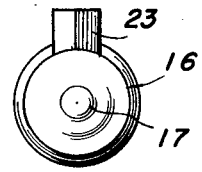
FIG. 4
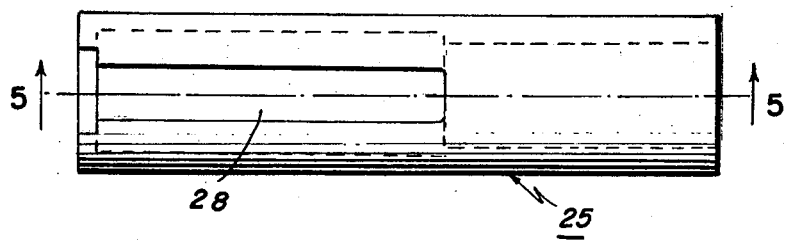
FIG. 5     FIG. 6
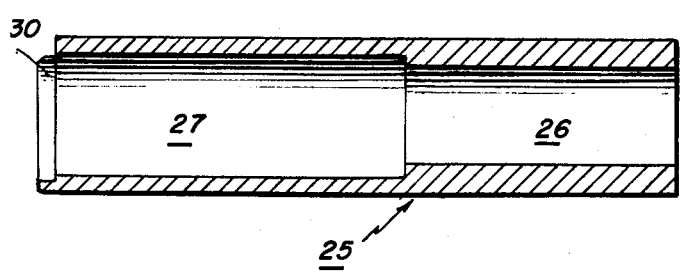 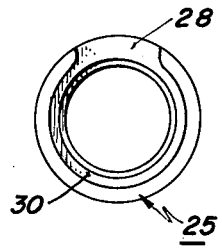
Inventor
HANS. ERDMANN
By
Attorney Sept. 24, 1957 H. ERDMANN 2,807,078
APPARATUS FOR ASSEMBLING OPEN-ENDED SPRING RETAINING
RINGS ON GROOVED SHAFTS, PINS AND THE LIKE
Filed July 7, 1955 2 Sheets-Sheet 2
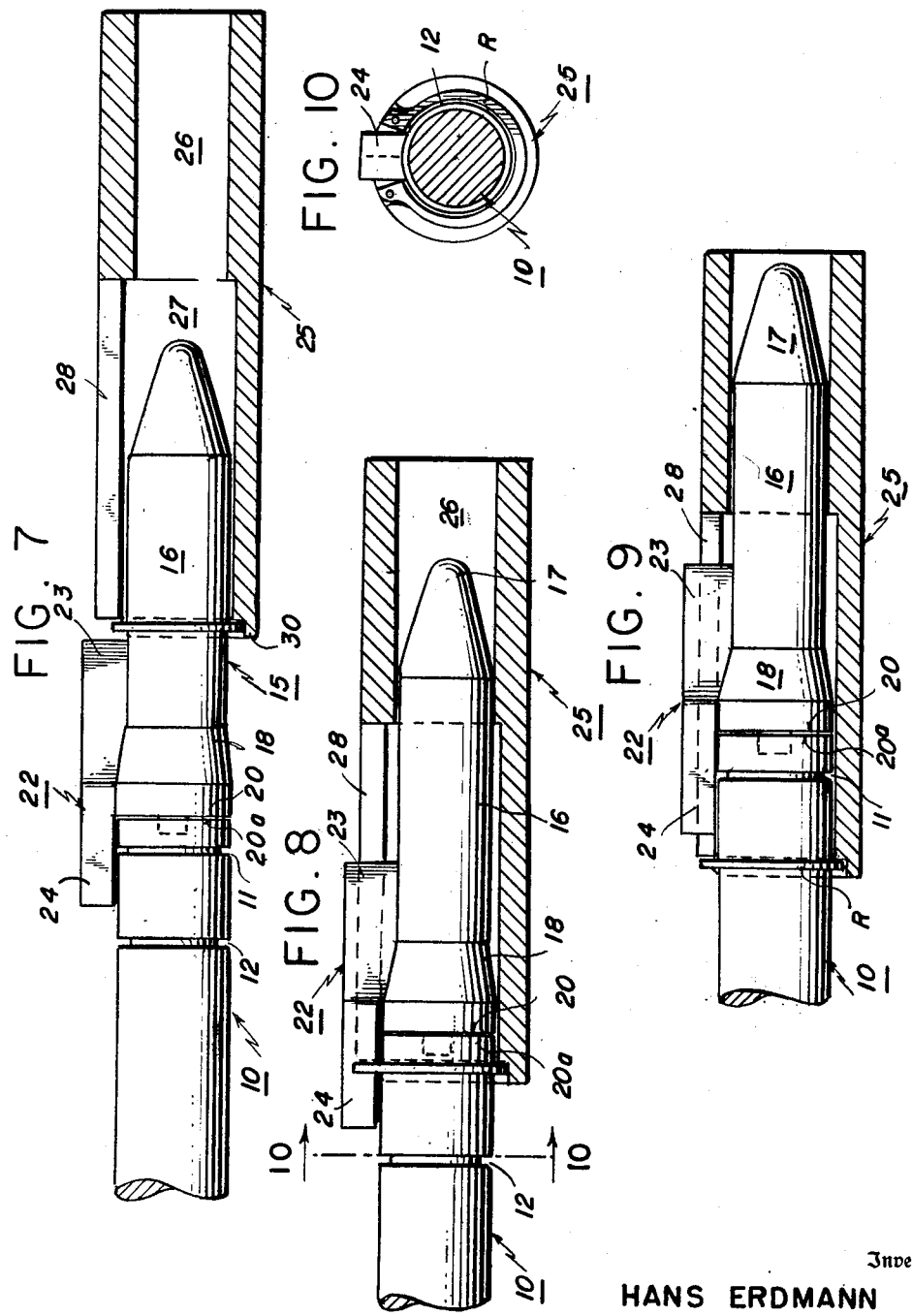
Inventor
HANS ERDMANN United States Patent Office 2,807,078
Patented Sept. 24, 1957

2,807,078

APPARATUS FOR ASSEMBLING OPEN-ENDED SPRING RETAINING RINGS ON GROOVED SHAFTS, PINS AND THE LIKE

Hans Erdmann, Maplewood, N. J., assignor to Waldes Kohinoor, Inc., Long Island City, N. Y., a corporation of New York Application July 7, 1955, Serial No. 520,578

4 Claims. (Cl. 29—229)

This invention relates to improvements in apparatus for assembling open-ended spring retaining rings on grooved shafts, pins and the like, and more particularly to apparatus for assembling a retaining ring in a particular groove of a shaft having a plurality of ring-receiving grooves.

As is well known, open-ended or so-called split retaining rings are assembled in grooves of shafts by spreading them over the end of the shaft and then shifting them along the shaft to the plane of the groove, whereupon when released they spring-seat themselves in the groove. When assembling retaining rings in a particular groove of shafts provided with a plurality of axially spaced grooves through the use of sleeve and mandrel type of ring-assembly apparatus as generally disclosed in my prior application Serial No. 516,073, filed June 17, 1955, a special problem arises of preventing the ring being shifted along the shaft from spring-seating itself in a groove, or in the first of a plurality of such grooves, disposed intermediate said particular groove and the end of the shaft.

Stated broadly, a main object of the present invention is the provision of sleeve and mandrel type ring-assembly apparatus generally as aforesaid which is capable of solving the aforesaid problem in simple yet effective and thoroughly dependable manner.

More particularly, an object of the invention is the provision of sleeve and mandrel type apparatus generally as aforesaid for assembling open-ended retaining rings on shafts provided with a plurality of ring-receiving grooves, which is so constructed and arranged as to insure the assembly of a ring in a particular one of said grooves for which it is intended.

A more specific object of the invention is the provision of sleeve and mandrel type apparatus for assembling an open-ended retaining ring in a particular one of a plurality of shaft grooves, which is so constructed and arranged as in effect to cause the ring to skip over any groove or grooves disposed intermediate said one groove and the end of the shaft.

Yet another object of the invention is the provision of sleeve and mandrel type apparatus generally as aforesaid for assembling open-ended retaining rings in shaft grooves, characterized by its ability to shift a ring past a shaft groove or grooves disposed intermediate a particular groove in which ring assembly is to be effected and the end of the shaft, while at the same time insuring against the ring being released into the intermediate groove or grooves.

A further object of the invention is the provision of sleeve and mandrel type apparatus generally as aforesaid for effecting assembly of an open-ended or split retaining ring in a selected one of a plurality of retaining ring grooves provided in a shaft, characterized by its ability to positively maintain the ring spread as it is being moved along the shaft to the plane of the one groove in which it is to be assembled.

The above and other objects and advantages of apparatus for assembling retaining rings in grooved shafts according to the present invention will appear from the following detailed description thereof, in which reference is had to the accompanying drawings illustrating a specific example, thereof, wherein:

Figs. 1 and 2 are plan and side views, respectively, of the mandrel component of the apparatus of the invention;

Fig. 3 is an end view looking on to the right or head end of the mandrel;

Fig. 4 is a plan view of the sleeve component of the apparatus of the invention;

Fig. 5 is a longitudinal section through the sleeve, taken along line 5—5 of Fig. 4;

Fig. 6 is an end view looking into the left or ring-engaging end of the sleeve;

Figs. 7, 8 and 9 illustrate three different stages of the assembly of an open-ended retaining ring on a grooved shaft by the apparatus of the invention; and Fig. 10 is a section taken along line 10—10 of Fig. 8 intended to illustrate the function of the mandrel rib in preventing release of a retaining ring to a groove in advance of the particular groove in which it is to be assembled.

Referring to the drawings, reference numeral 10 (Figs. 7–10) generally designates a shaft having a plurality of retaining ring grooves cut or otherwise provided therein. While two such grooves designated 11 and 12 have been illustrated, it is to be understood that the number of grooves provided in the shaft will depend on the particular ring application. When it is desired to assemble a retaining ring in an inner groove exemplified by the groove 12, as by means of a sleeve and mandrel type of ring-assembly apparatus as generally disclosed in my prior application Serial No. 516,073 aforesaid, there arises the problem of preventing the ring being shifted or pushed along the end of the shaft by the sleeve from spring-seating itself into a groove (typified by the outer groove 11) disposed between said inner groove 12 and the end of the shaft. Obviously, if a ring is assembled in the outer groove 11, when it should have been assembled in the inner groove 12, the axial position of the machine part such as a gear, bearing race, etc. to be located by said ring is seriously disturbed. Also, if rings are to be assembled in both grooves 11 and 12 and by chance a ring is assembled in the outer groove 11 first, difficulties arise in assembling the second ring in groove 12. Thus, it becomes clear that a ring being assembled by being pushed along the shaft as by a sleeve must be made to skip any and all shaft grooves which precede the particular groove in which assembly is desired, because otherwise the ring will seat itself in the preceding groove, or in the endmost one of the preceding grooves if plural preceding grooves are present.

To solve the aforesaid problem in simple yet effective manner, the invention incorporates into the known sleeve and mandrel type of ring-assembly apparatus means for positively maintaining a ring being assembled thereby in spread condition until it arrives substantially at the plane of the groove in which it is to seat, as will now be described in connection with the mandrel designated 15 and the sleeve designated 25. Referring to Figs. 1–3, illustrative of the mandrel, such comprises a cylindrical body portion 16 of diameter corresponding substantially to the inner diameter of the rings being assembled in their unstressed state, said body portion terminating at one end in a conically shaped head 17 which facilitates threading of the rings to be assembled on to the mandrel proper and at its other end merging into a frusto-conical portion 18 whose larger diameter end preferably connects to a short-length cylindrical portion 19 of diameter substantially equaling the diameter of the aforesaid shaft 10. The end faces 20, 20a of the mandrel and shaft, respectively, are formed square and the mandrel end face is provided with a central stud-like protrusion 21 adapted to enter a corresponding recess in the end face of the shaft, the protrusion 21 thus serving as an aligning pin for centering the mandrel 15 with the shaft when it is placed in end-to-end relation therewith, as illustrated in Figs. 7–10.

As best seen in Fig. 1, the mandrel 15 is provided with an elongated, radially projecting rib 22 having a pointed or wedge-shaped portion 23 which as shown extends forwardly from the shaft-engaging end portion 19 of the mandrel and with a straight-sided portion 24 which extends rearwardly a substantial distance beyond the mandrel end face 20, thus to overhang the shaft when the mandrel is placed in end-to-end relation therewith. As will appear hereinafter, the pointed or wedge-shaped forward portion 23 of the rib is adapted to enter the gap between the open ends of a ring moving axially to the left along the mandrel body portion and thereupon to spread the ring the amount enabling it to move more or less freely along the frusto-conical portion 18 of the mandrel (whose coning angle corresponds to the wedge angle of said rib portion 23), thence over the larger diameter end portion 19 of the mandrel, and thence over the end of the shaft 10. Accordingly, the width of the wider end of said wedge-shaped portion 23 of the rib is such as to spread the ring the required amount, without at the same time overspreading the ring as can impart a permanent set thereto. Since the straight-sided rearward portion 24 of the rib has width corresponding to the widest end of the wedge-shaped forward portion thereof, it serves positively to maintain the ring spread as it is moved throughout its length. That is to say, the rearward portion 24 of the rib positively insures against the ring being released, accidentally or otherwise, to a shaft groove bridged thereby.

The aforesaid sleeve 25 serves, when telescoped over the mandrel 15, to push a ring placed on or fed to the body portion 16 of the mandrel along the length thereof and thence to and along the shaft end to the plane of the groove into which it is to be assembled. Accordingly, the sleeve has a stepped-diameter bore for the reception of the mandrel, the smaller bore portion 26 having diameter substantially equaling that of the cylindrical body portion 16 of the mandrel, and the larger bore portion 27 having diameter corresponding to the somewhat larger diameter of the shaft-end portion 19 of the mandrel and hence of the shaft 10. As seen in Fig. 9, the axial length of the sleeve is substantially equal to the total of the axial length of the mandrel 15 and of the distance that the groove in which assembly of a ring is to be effected is spaced from the end of the shaft 10. To accommodate the rib 22 as the sleeve 25 is telescoped over the mandrel 10, the sleeve is provided with a slot 28 having width slightly greater than the width of the rearward rib portion 24 and which opens through the working or ring-engaging end of the sleeve and extends axially therealong a distance substantially greater than the axial length of said rib. According to a further feature of the invention, the ring-engaging end edge of the sleeve is undercut as at 30 (Fig. 5) so as to provide an inwardly-opening shallow pocket or seat for the ring being assembled.

In use of a retaining ring assembling apparatus as described, and assuming that ring assembly is to be effected in the inner shaft groove 12, an open-ended retaining ring designated R is slipped over the conical end 17 of the mandrel on to the body portion 16 thereof, and said mandrel is centered on the shaft 10 in end-to-end relation therewith, as in Fig. 7. In placing the ring on the mandrel, care is taken to orient the ring so that the gap between its open ends is axially alinged with the mandrel rib 22, whereby the latter may enter said gap upon the ring being pushed along the mandrel. The sleeve 25 is then telescoped over the mandrel, sufficient axial force being applied to the sleeve as to cause it to push the ring along the length of the mandrel body portion 16, thence along the frusto-conical portion 18 of the mandrel, thence along its larger diameter end portion 19, and, finally, over the end of the shaft 10. Consequent to the spreading action of the rib 24, the ring R is spread the controlled amount enabling it to move over and along the end of the shaft 10 without being overspread. Final telescoping movement of the sleeve over the mandrel 10 results in the ring moving past the straight-sided rearward portion 24 of the rib, whereupon it is free to contract on the shaft. Upon the ring finally arriving at the plane of the shaft groove 12, it spring-seats itself in said groove, whereupon the sleeve and mandrel may now be freely backed off the shaft end, thus completing the ring assembly operation.

It will be observed that in its movement over the shaft end to the plane of its groove 12 it was necessary for the ring to move over and past the shaft groove 11 disposed intermediate said groove 12 and the end of the shaft. However, as the straight-sided rearward portion 24 of the rib 22 is shown to have length such that it extends over and bridges said intermediate groove 11, said rib portion serves positively to maintain the ring spread in its movement over and past said groove, thus positively insuring against the ring being released to said groove 11 in its movement to groove 12 in which assembly is intended. The above will make it clear that the axial length of the rib portion 24, or at least the distance that it overhangs the shaft end, will always be such that the rib bridges each and every shaft groove disposed intermediate the groove in which ring-assembly is to be effected and the end of the shaft.

The above described apparatus may be constructed as a manual tool, in which case the mandrel 15 is positioned by hand, and the sleeve 25 telescoped thereover by hand force applied thereto; or the mandrel and sleeve may be constructed for machine operation, in which case the mandrel and sleeve may be mounted and operated as are the mandrel and sleeve components of the retaining ring assembling apparatus disclosed and claimed in my aforesaid application Serial No. 516,073, filed June 17, 1955.

Without further analysis, it will be appreciated that apparatus for assembling open-ended spring retaining rings on grooved shafts as illustrated and described herein achieves the objectives of such apparatus as outlined in the foregoing. However, as many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for assembling an open-ended spring retaining ring in a particular groove of a shaft provided with a plurality of ring-receiving grooves disposed in axially spaced relation therealong comprising, in combination, a ring-spreading mandrel adapted to be engaged end-to-end with the shaft, said mandrel having a ring-receiving cylindrical body of diameter as to slidably accommodate a ring to be assembled in its unstressed state and a frusto-conical rearward end portion whose forward end has diameter corresponding to that of the cylindrical body portion and whose rearward end has diameter corresponding to that of the shaft, a radially projecting rib affixed to said mandrel and extending longitudinally from the body portion to beyond the rearward end thereof, said rib including a wedge-shaped forward portion disposed to point forwardly and extending axially along the frusto-conical portion of the mandrel and a parallel sided rearward portion which extends axially-rearwardly beyond the shaft-engaging end of the mandrel a distance not substantially less than the distance that the particular groove is spaced from the end of the shaft, said wedge-shaped forward end portion of the rib and said frusto-conical portion of the mandrel being together operative to effect spreading of the ring moving along the same the controlled amount enabling the ring to be moved over the shaft without overspreading and said parallel-sided portion of the rib positively maintaining the ring spread said controlled amount for the length thereof, and a sleeve having telescoping fit on the mandrel and adapted when slid thereover to engage with its working end and thereupon to push a ring received on the mandrel along the length thereof and thence over the shaft end and thence to the plane of the particular shaft groove, said sleeve having a slot extending from its work-engaging end into the same, said slot being of a size to slidably accommodate the rib.

2. Apparatus substantially as set forth in claim 1, wherein the forward end of the mandrel body portion is shaped as a pointed head.

3. Apparatus substantially as set forth in claim 1, wherein the mandrel is provided at its rearward end with an aligning pin adapted to seat in a complemental recess provided therefor in the shaft end.

4. Apparatus substantially as set forth in claim 1 wherein the work-engaging end of the sleeve is formed with a ring recess providing a seat for the ring engaged by said end.

References Cited in the file of this patent

UNITED STATES PATENTS

| | | |
|---|---|---|
| 979,438 | Courtney | Dec. 27, 1910 |
| 1,580,235 | Di Prima | Apr. 13, 1926 |
| 2,663,883 | Breundlich | Dec. 29, 1953 |
| 2,669,772 | Hamler | Feb. 23, 1954 |

FOREIGN PATENTS

| | | |
|---|---|---|
| 584,290 | Great Britain | Jan. 10, 1947 |